Oct. 22, 1968     W. C. TRUTE     3,406,440

METHOD OF FORMING MULTI-GROOVE PULLEYS

Filed Feb. 24, 1966     2 Sheets-Sheet 1

INVENTOR
WILLIAM C. TRUTE

BY *Teegno & Toddy*

ATTORNEYS

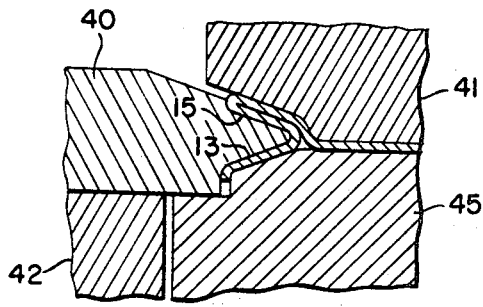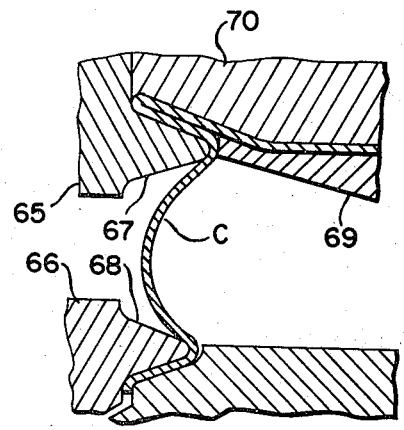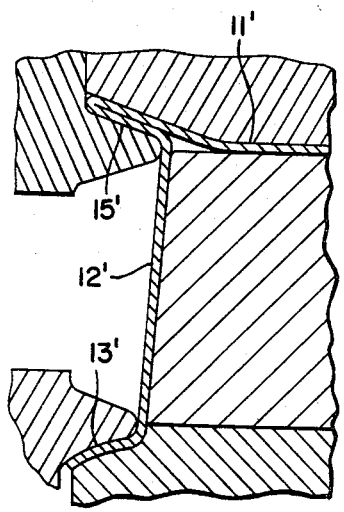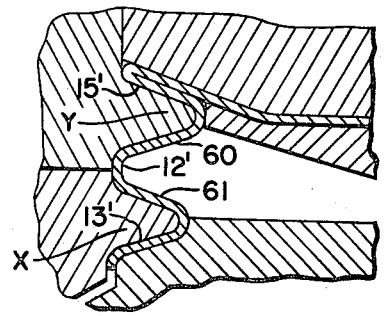

United States Patent Office 3,406,440
Patented Oct. 22, 1968

3,406,440
METHOD OF FORMING MULTI-GROOVE PULLEYS
William C. Trute, Warren, Mich., assignor to Eaton Yale
& Towne Inc., Cleveland, Ohio, a corporation of Ohio
Filed Feb. 24, 1966, Ser. No. 529,885
18 Claims. (Cl. 29—159)

ABSTRACT OF THE DISCLOSURE

Method of making V-pulleys from sheet metal by a progressive die stamping operation in which all operations are accomplished by external compression forces applied to the blank in an axial direction.

---

The present invention relates to a method for making pulleys and more particularly to a method for making pulleys from sheet metal by stamping operations alone. The invention concerns itself with a new and novel method of making a peripherally grooved pulley sheave by progressive die operation.

In the past, pulley sheaves having generally V-shaped peripheral grooves were made from sheet metal by many different methods including spinning on a lathe to form the flanges, stamping in two separate parts and then securing the two parts together by spot welding or the like, or utilization of an internal expander within a cup-shaped blank for bulging and forcing the walls of the blank outwardly, the bulge ultimately being crimped together to form one of the flanges of the V-shaped pulley groove. The method of spinning sheet metal on a lathe to form a pulley is tedious, time consuming and costly, and the method of stamping two separate parts followed by welding or riveting them together is time consuming and costly and deprives the pulley of strength which is obtained when the pulley is made in a single piece. Utilization of an internal expander within the blank for bulging the walls of the blank outwardly is an undesirable process for making pulleys because the internal expander from time to time has to be replaced; such replacement requiring a shutting down of the stamping operations and a temporary loss of production, besides the added expense of replacing the internal expander.

According to the present invention, the pulley is made in a single piece from sheet metal by stamping operations alone by a progressive die process, thereby avoiding the disadvantages mentioned above.

One object of this invention therefore, resides in providing a method for making pulleys from sheet metal by stamping alone by utilizing a progressive die process.

Another object of the invention resides in the method of making a V-grooved pulley from cold deformable metal in which all of the operations are accomplished by external compression forces applied to the pulley blank in an axial direction.

A still further object of the invention resides in the method of making a peripherally grooved one-piece sheet metal pulley in which a sheet metal blank is first drawn into substantially cup-shape; then a portion of the base of the pulley blank is reverse drawn to form a circular flange at the corner of the blank and the circular flange is folded upon itself and collapsed and turned radially outwardly to form with the terminal end of the pulley blank wall, the peripheral groove of the pulley.

Another object of the invention resides in the method of making a dual-grooved pulley from sheet metal by stamping operations alone utilizing a progressive die process.

A still further object of this invention is to provide a method for making high quality, very accurate, and constant radius pulleys by ordinary blanking and forming dies and rolls.

Other objects and advantages of the invention will be apparent from the following description, dependent claims, and the accompanying drawings, in which:

FIGURES 1–4 inclusive show the successive stages in the process of this invention of stamping a pulley from a sheet metal blank, each view being in vertical cross-section.

FIGURE 7 is a vertical cross-sectional view of the dies in the next immediate step after that illustrated in FIGURE 6 in which the circular flange is collapsed and turned radially outwardly.

FIGURE 8 is a sectional view of a dual grooved pulley made by a process of this invention.

FIGURES 9–11 illustrate successive steps in the making of a dual grooved pulley showing the dies utilized in vertical cross-section.

Before explaning the present invention in detail, it is to be understood that the invention is not limited in its application to the particular shapes or forms of the pulleys as illustrated in the accompanying drawings since the invention is capable of other shapes and forms and for other uses besides pulleys per se. Also, it is to be understood that the phraseology or terminology employed herein is for the purpose of description and not limitation.

Figure 1:
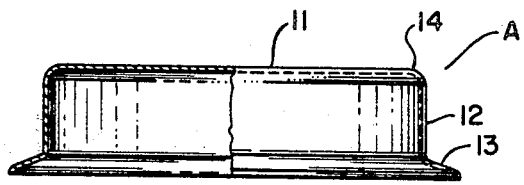
Figure 2:
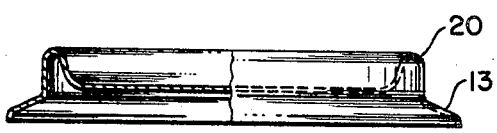
Figure 3:
Figure 4:
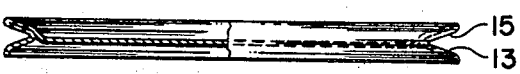

With reference to FIGURES 1–4 inclusive, a piece of sheet metal is first stamped to form a cylindrical cup-shaped member generally indicated as A in FIGURE 1. This cup-shaped blank A has a base portion 11 and a lateral wall portion generally indicated as 12. The blank A is stamped and drawn by conventional stamping methods to form a terminal outwardly flaring portion 13 at the extremity of the wall portion 12 of the pulley blank. The outer surface of the outwardly flaring portion 13 comprises one of the pulley engaging surfaces of the V-shaped pulley groove. The next operation as shown in FIGURE 2 consists in reverse drawing a portion of the base 11 axially in a direction toward the wall terminal portion 13 to form an annular flange 20 near the junction of the pulley blank base and wall. In the next operation illustrated in FIGURE 3, the annular flange 20 is compressed or folded upon itself and in turn slightly radially outwardly from its substantially axial shape of FIGURE 2. In FIGURE 4 the final stamping operation is illustrated in which the folding of the circular flange 20 upon itself is completed and the flange is collapsed and turned radially outwardly towards the terminal outwardly flaring portion 13 of the sheave wall; the resulting surface 15 and the opposite outer surface of portion 13, together form the desired V-shaped peripheral groove of the pulley.

Figures 5, 6:
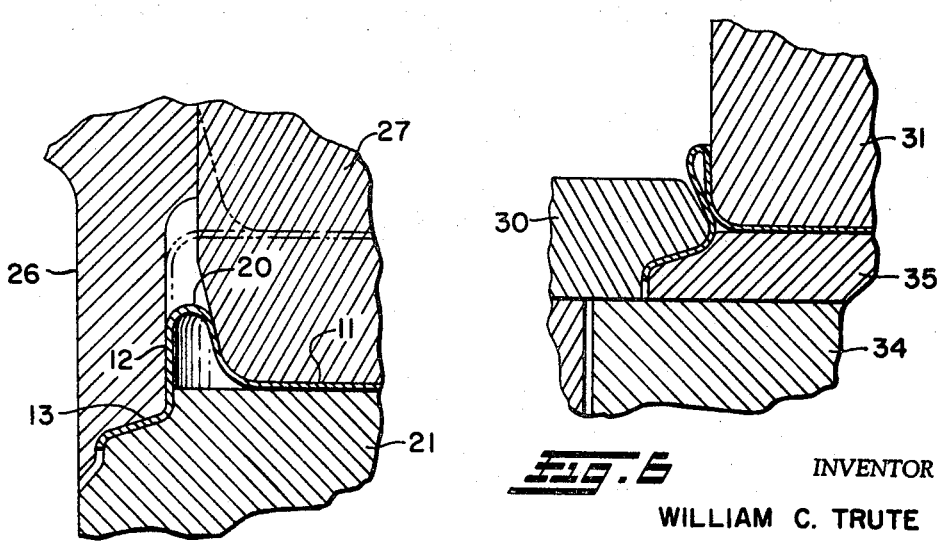
FIGURE 5 is a vertical cross-section of the stamping dies during the reverse drawing stamping operation.
FIGURE 6 is a vertical cross-sectional view of the stamping dies showing the next step in which the circular flange is partially folded back upon itself.

With reference to FIGURE 5, details of a stamping press are shown which include a form punch 21 removably secured to a die holder in a conventional manner. A blank holding ring 26 engages the blank wall 12 and the terminal portion 13 maintaining said portions in place during this operation. A central die member 27 engages the major portion of the base 11 and reverse draws the base portion in an axial direction toward said wall terminal portion 13 until said base portion 11 engages the form punch 21. FIGURE 5 illustrates in phantom the original shape of the blank before the stamping operation of FIGURE 5 takes place. The reverse drawing operation of FIGURE 5 forms the annular flange 20 near the junction of the wall base 11 and wall 12.

The next step in the process of forming an integral sheet metal peripherally grooved pulley, as illustrated in FIGURE 4, is to replace the partially formed, reverse drawn blank of FIGURE 5 in a different set of dies, as illustrated in FIGURE 6 in which, here again, a form punch 35 is shaped to receive the terminal flange portion 13 of the blank wall. A pair of radially operable semi-circular slide form blocks 30, which constitute a split ring assembly, are slidably mounted on the holder 34. A portion of the blocks 30 and the opposite surface of the form punch 35 are shaped to complement each other and receive the flaring portion 13 so that the blank will be gripped around its terminal flaring portion 13 during the immediate stamping operation illustrated in FIGURE 6. By conventional methods, well known in the stamping art, the die blocks 30 are crammed together to the position shown in FIGURE 6 when the die member 31 is lowered. In the stamping operation of FIGURE 6 when the die member 31 is lowered the annular flange 20 is compressed or folded upon itself and turned slightly radially outward from its axial position of FIGURE 5.

The next operation to be described, and as illustrated in FIGURE 7, produces a further overlapping or folding of the annular flange member upon itself and a further collapsing and turning radially outwardly of the annular flange 15. In the set of dies illustrated in FIGURE 7 a form punch 45 is shaped to receive the flaring portion 13 of the blank wall. A pair of semi-circular slide form blocks 40, which constitute a split ring assembly, are slidably mounted on the holder 42. The blank-engaging portion of the blocks 40 has a cross-sectional shape corresponding to the desired V-shaped pulley groove and complements the form punch 45 so that the blank will be gripped around its terminal flaring portion 13 during the stamping operation of FIGURE 7. Lowering of a die member 41 effects the collapsing and radially outwardly movement of the folded annular flange 20 toward the terminal flaring portion 13. By this operation, the collapsed or folded annular flange surface 15 is transformed into a surface of the pulley groove opposite the outer surface of portion 13.

In addition to the illustrated steps of the process it might be desirous to also punch a center opening in the base portion of the blank to receive a hub, and to trim the edge of the flange 13 to provide a rounded edge. The punching of the center opening could be carried out simultaneously with the reverse drawing operation illustrated in FIGURE 2 or it could be done in a separate process or step from those illustrated and described. The trimming operation of the flange 13, if desired, could be completed during the initial preforming operation or immediately thereafter, or could be done simultaneously with the reverse drawing operation illustrated in FIGURE 2.

FIGURE 8 shows a finished dual-grooved pulley, generally indicated as B which is made by a process having similar steps to that utilized in making the single groove pulley of FIGURES 5-7 along with the additional steps of FIGURES 9-11. The partially formed blank of FIGURE 9 is formed in much the same manner as the corresponding blank of FIGURE 7, that is, the surface 15' has been formed by reverse drawing the pulley blank base to form an annular flange, folding the formed annular flange upon itself, and collapsing and turning radially outwardly of the surface 15' in similar steps to that of FIGURES 5, 6 and 7 respectively. The partially formed blank of FIGURE 9 has completed outwardly flaring surfaces 13' and 15' which will comprise the outer surfaces of the finished grooves of the dual-groove sheave as illustrated in FIGURE 8. The depth of the blank wall 12' at this stage, that is, the length of the pulley blank wall 12' connecting the ends of formed surfaces 13' and 15' determines to a large extent, though not completely, the final depth of the middle surfaces 60 and 61 with respect to the outside surfaces 13' and 15' of the finished V-shaped pulley grooves. In the final step of forming the dual-groove pulley as illustrated in FIGURES 10 and 11, blank holding die sections 65 and 66, having cross-sections corresponding to the desired V-shaped pulley grooves, are shaped to complement the formed surfaces 13' and 15' of the partially formed pulley blank and have surfaces 67 and 68 for receiving portions of the pulley blank wall 12'. Form punch members 68 and 69 and the opposite blank holding die sections 66, 65 grip the terminal flaring portions 13' and 15' during the stamping operation of FIGURES 10 and 11. Upon downward movement of a die 70, as shown in FIGURE 10, the wall portion 12' will bulge outwardly to a convex shape generally indicated at C. Continued downward movement of die 70 will effect movement of wall portion C into engagement with the holding die sections receiving surfaces 67 and 68. The bulging of the pulley blank wall 12' into form C and the subsequent engagement and forming of the wall C with holding die sections receiving surfaces 67 and 68 to form middle surfaces 60 and 61 of the finished dual-grooved pulley as shown in FIGURE 11 is one continuous step.

In the process illustrated in FIGURES 9-11, the wall 12' of the pulley blank is tapered outwardly from its base. Such a utilization of a tapered wall is advantageous in making a dual-grooved pulley wherein it is desirable to have pulley grooves of different diameters. In the pulley made by the particular process illustrated in FIGURES 9-11, the V-shaped groove generally indicated as X has a slightly larger diameter than the V-shaped groove generally indicated as Y. This difference in groove diameters is brought about by utilization of a slightly larger upper blank holding die section 65 relative to the corresponding lower die section 66, and the outwardly tapered wall 12'. The process of making dual-grooved pulleys as illustrated in FIGURES 9-11 and described above is readily adaptable to making of pulleys having dual-grooves of equal diameters by utilization of identical blank holding die sections (corresponding to blank holding die sections 65 and 66 of FIGURE 10) and a pulley blank wall of uniform diameter.

It is to be understood that if so desired the dual-grooved pulley of FIGURE 11 could have a center opening punched in its base 11' and the edge of the flange 13 trimmed to provide a rounded edge as discussed above regarding the single groove pulley. Furthermore, the process of making the dual-grooved pulley is adaptable to making pulleys having other desired shapes than that illustrated in FIGURE 11.

It should be understood that the preferred embodiment of the present invention has been described herein in great detail and that certain modifications and changes therein may be made by those skilled in the art to which it relates and it is intended to cover hereby all changes, adaptations and modifications falling within the scope of the appended claims.

Having described my invention, I claim:

1. A method of making a peripherally grooved sheet metal article comprising:
    drawing a sheet metal blank to substantially cup-shape to provide a central base portion and wall extending therefrom having a terminal outwardly flaring portion forming one surface of said peripheral groove,
    reverse drawing at least a portion of said central base portion in an axial direction internally of the wall to form a substantially axially extending annular flange near the junction of the base and wall portions while maintaining the diameter of the wall where it joins the outwardly flaring portion,
    stamp folding said annular flange on itself, and
    stamp collapsing and turning radially outwardly the folded annular flange to form one surface of the peripheral groove opposite the surface of said terminal flaring portion.

2. The method of making a peripherally grooved sheet metal article as set forth in claim 1 wherein the groove is generally V-shaped.

3. The method of making a peripherally grooved sheet

4. The method of making a peripherally grooved sheet metal article as set forth in claim 1 in which all of the operations are accomplished by compression forces applied to the blank in an axial direction.

metal article as set forth in claim 1 including the step of trimming the edge of the flaring terminal wall portion to provide a rounded edge.

5. The method of making a peripherally grooved sheet metal article as set forth in claim 1 including the step of punching a center opening from the base portion.

6. The method of making a peripherally grooved sheet metal article as set forth in claim 1 in which the annular flange is moved slightly radially outwardly during the folding operation.

7. The method of making a peripherally grooved sheet metal article as set forth in claim 3 wherein all the operations are accomplished in a stamping press.

8. A method of making a peripherally grooved pulley comprising:
   in a single step stamping a sheet of ductile material into a cup-shape including a radially extending base and an axially extending side wall having an endless edge and flaring the endless edge of the side wall as a lip in a direction radially outwardly away from the remainder of the side wall,
   pressing the central portion of the base axially toward the endless edge to form a folded annular flange substantially at the junction of the base and wall portions while maintaining the diameter of the side wall where it joins said lip,
   in a single step stamp folding said annular flange together on itself, and
   then collapsing and turning radially outwardly the folded annular flange to form one surface of the peripheral groove opposite to said initially formed lip.

9. The method of making a peripherally grooved sheet metal article as set forth in claim 8 in which all of the operations are accomplished by compression forces applied to the blank in an axial direction.

10. The method of making a peripherally grooved sheet metal article as set forth in claim 8 wherein all the operations are accomplished in a stamping press.

11. A method of making a peripherally multi-grooved sheet metal member comprising:
    drawing a sheet metal blank to substantially cup-shape to provide a central base portion and wall extending therefrom having a terminal outwardly flaring portion,
    reverse drawing at least a portion of said central base portion in an axial direction internally of the wall to form a substantially axially extending annular flange at the corner of the blank while maintaining the diameter of the wall portion between said formed annular flange and said outwardly flaring portion,
    folding said circular flange on itself,
    turning said folded circular flange radially outwardly,
    forming an annular bulge in said wall portion between said opposed terminal flaring portion and said folded circular flange and in the same operation axially compressing the opposed sides of said annular bulge portion toward each other to form one side of adjacent peripheral grooves,
    the other sides of which are provided by the outwardly flaring terminal portion and the radially turned circular flange of said wall.

12. The method of making a peripherally multi-grooved sheet metal member as set forth in claim 11 wherein the wall of the cup-shaped blank is tapered outwardly away from said base.

13. The method of making a peripherally grooved sheet metal member as set forth in claim 11 wherein the grooves are generally V-shaped.

14. The method of making a peripherally grooved sheet metal member as set forth in claim 11 in which all of the operations are accomplished by compression forces applied to the blank in an axial direction.

15. The method of making a peripherally grooved sheet metal member as set forth in claim 11 including the step of trimming the edge of the flaring terminal wall portion to provide a rounded edge.

16. The method of making a peripherally grooved sheet metal member as set forth in claim 11 including the step of punching a center opening from the base portion.

17. The method of making a peripherally grooved sheet metal member as set forth in claim 11 in which the circular flange is moved slightly radially outwardly during the folding operation.

18. The method of making a peripherally multi-grooved sheet metal member as set forth in claim 11 wherein the cup-shape blank wall is of uniform diameter.

References Cited

UNITED STATES PATENTS

| | | | |
|---|---|---|---|
| 2,493,053 | 1/1950 | Zatyko | 72—378 |
| 2,805,582 | 9/1957 | Greene | 74—230.8 |
| 2,826,804 | 3/1958 | Wickwire et al. | 29—159 |
| 2,869,223 | 1/1959 | Killian et al. | 29—159 |
| 2,929,345 | 3/1960 | Zatyko | 72—378 |
| 3,128,539 | 4/1964 | Brooks et al. | 29—159 |

THOMAS H. EAGER, *Primary Examiner.*